3,159,220
SELF-CLEANING RACING PLATE
Newman H. Gist, 9170 Harness Drive, Spring Valley, Calif., and Smith G. Fowler, Rancho Jamacha, El Cajon, Calif.
Filed Oct. 16, 1961, Ser. No. 145,247
2 Claims. (Cl. 168—24)

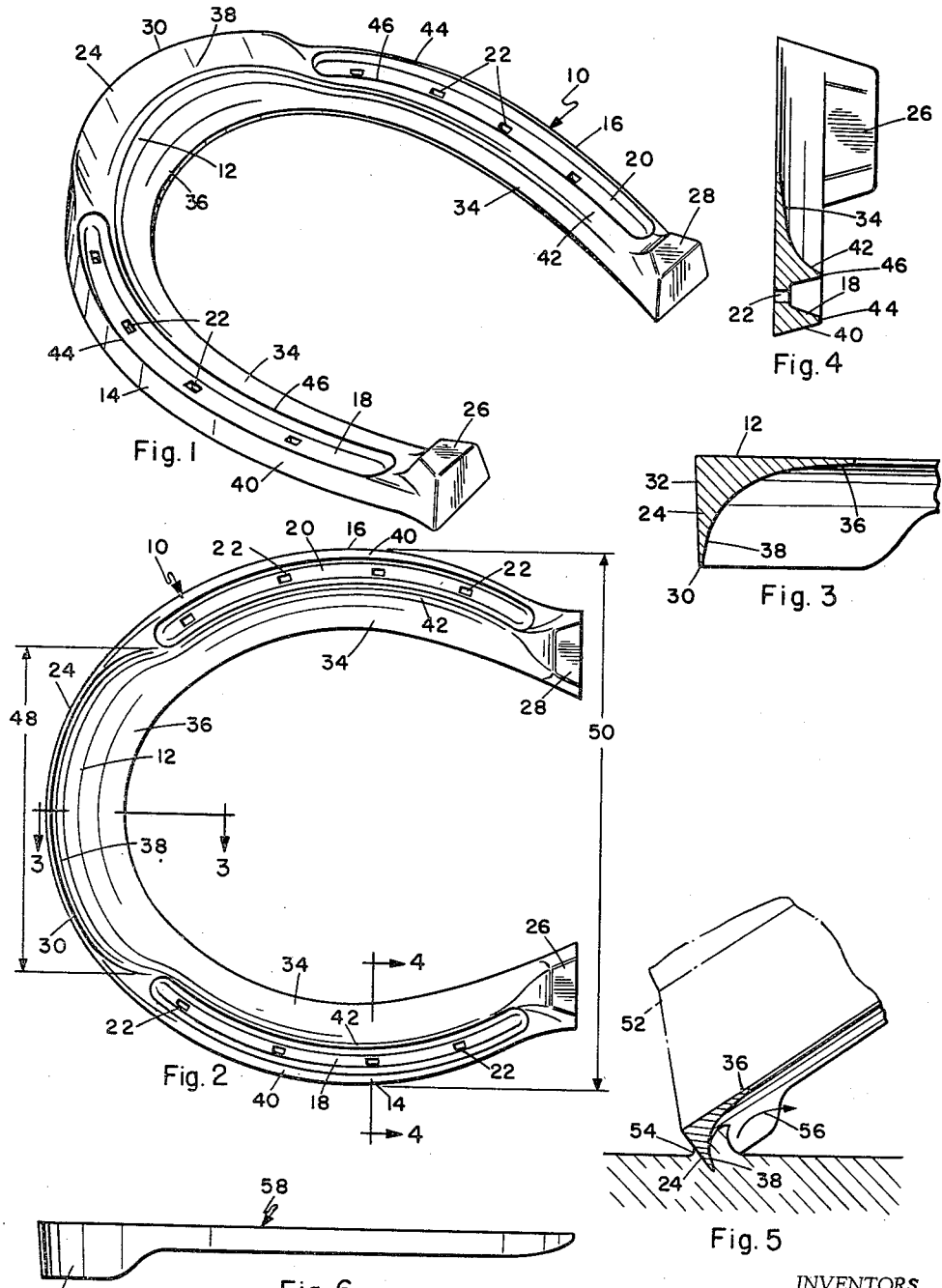

This invention relates to a self-cleaning racing horseshoe, and more particularly to one that remains at substantially the same lightweight for the entire duration of a race.

Background

Horse races are so competitive that fractions of a second distinguish between winners and also-rans. It is therefore essential that race horses be provided with every possible feature that will permit them to run faster. One such feature is a lightweight horseshoe; and many types thereof have been proposed in the past.

It is our belief that one extremely important feature has been overlooked; and we have conceived an invention to take advantage of it.

We have noted that practically every horseshoe presently available tends to pick up dirt from the track; and that the dirt either adheres to the bottom of the horseshoe, or tends to pack into discontinuities thereof.

The accumulated dirt may weigh only an ounce or two, but we have found that each of the four horseshoes tends to accumulate a slightly different amount of dirt than the others. As a result, the horse reacts; and his gait is impaired. This impairment is of course, slight, but since fractions of a second are important, it may mean the difference between winning and losing a race.

We have conducted comparative tests between our horseshoe and those of other manufacturers; and invariably our horseshoes have all been free of dirt, whereas other horseshoes have accumulated different amounts thereof.

Horses have been repeatedly clocked in tests of these racing plates and again an appreciably shorter time has substantially invariably resulted when our horseshoes were used.

Objects and Drawings

It is therefore the principal object of our invention to provide an improved horseshoe.

It is another object of our invention to provide an improved racing horseshoe that does not accumulate dirt.

It is a further object of our invention to provide an improved racing horseshoe that achieves a given weight after slight usage, and retains the same weight thereafter.

Still another object is to provide a racing plate having a toe calk of an increased chordal length measured transversely of the plate and provided with rearwardly extending lateral or terminal portions which tend to prevent slide slip, especially at the instant of breakover and which have a gentle corrective function.

The attainment of these and other objects will be realized from the following specification, taken in conjunction with the drawings of which:

FIGURE 1 is a perspective view of the under side of our horseshoe;

FIGURE 2 is a plan view thereof;

FIGURE 3 is an enlarged sectional view taken on line 3——3 of FIGURE 2;

FIGURE 4 is an enlarged sectional view taken on line 4—4 of FIGURE 2;

FIGURE 5 is a diagrammatic view of the self-cleaning action; and

FIGURE 6 is a side elevation view of a modified form of the horseshoe.

Brief Description of the Invention

Broadly stated, our invention contemplates a horseshoe whose ground-contacting portion comprises a smooth continuous surface that does not have any sudden discontinuities, irregularities, or abrupt protrusions.

Moreover, our horseshoe has a nailing groove that immediately packs full of dirt and remains tightly packed thereafter, without any tendency to initiate collection or compaction of dirt in other portions of the shoe.

Furthermore, the toe portion of the horseshoe is so shaped that at each contact with the ground it automatically applies a pressure in such a direction as to dislodge any dirt that may have been picked up in a prior stride.

The theory, structure, and operation of our invention will be explained in the following specification.

Detailed Description of the Invention

FIGURE 1, which shows the ground-contacting underside of the horseshoe, illustrates the smooth regularly curved undersurface configuration of our horseshoe.

The horseshoe 10 has a size and outline to match that of the horse's hoof; the material of shoe 10 being sufficiently malleable to permit minor changes in diameter and shape. Shoe 10 comprises an arcuate toe portion 12, and arcuate side runners 14 and 16. Runners 14 and 16 are continuous with respective ends of toe portion 12, and contain longitudinal nail grooves 18 and 20, each having number of suitably spaced nail holes 22.

An arcuate toe calk 24 is integral with the toe portion, and heel calks 26 and 28 are integral with the rearmost portions of the side runners.

FIGURE 2 is a view of the underside of the horseshoe; and taken with FIGURE 1, shows how the inner surface of the horseshoe is smoothly continuous and free of abrupt irregularities or protuberances.

In FIGURE 3, the details of the toe calk are shown in cross section. It will be noted that the toe calk 24 is wedge-shaped, so that the lower sharp edge 30 will dig into and grip the ground as the horse runs.

We have found that if the outer wall 32 taps inwardly by about 3 degrees, it controls the "breakover" point in a manner to be later described.

As may be seen, the bottom 34 of the runner is smoothly continuous with the bottom 36 of the toe calk; while the inner wall 38 of the toe calk has a smooth gradual curvature that fairs into the bottom 36 of the toe calk. As will be shown later, this curvature assures the loosening of dirt that may tend to adhere to the bottom of the horseshoe.

FIGURE 4 shows a cross section of the runner, nail groove, and nail hole. It will be noted that the outer wall 40 of the runner is actually the outer wall of the nail groove, and that the inner wall 42 of the runner is the inner wall of the nail groove. These walls are also tapered, and have sharp lower edges 44, 46 that bite into the surface of the race track, and thus permit the horse to obtain optimum footing.

The nail grooves 18 and 20 are designed to become packed with dirt during the first few strides of the horse, and to remain packed with dirt from then on. In this way each of the horse's feet has a substantially constant weight attached thereto; and the horse becomes accustomed to this weight. Should the weight change, as was the case with prior-art horseshoes, the horse has to re-accommodate himself every few strides; and we believe this continual re-accommodation impairs the horse's gait.

FIGURE 4 also shows that the inner wall 42 of the runner is smoothly curved to "fair" into the bottom 34 of the runner. Thus the toe calk, the runners, and the heel calks all coact to produce a smooth, curved surface to which dirt does not cling.

FIGURE 5 shows the "breakover" action of the horse's foot. As is well known, the foot 52 reaches forward and acts as a stiff pivot until the associated portion of the horse's body passes over the contact point 54 of the foot with the ground. At this time the horse's foot is in the position shown in FIGURE 5, and as the weight of the horse is transferred to another foot, the one formerly acting as a pivot tilts forward, using toe calk 24 as the pivoting point.

At a given instant, the weight moves ahead of toe calk 24. Since this foot no longer supports the horse's weight, the first joint begins to flex preparatory to another stride.

The position of the toe calk is thus involved in establishing the breakover point at which the horse begins to raise the foot. If the breakover begins too late, there is a danger of the front foot being struck by the forwardly moving back foot; whereas if the breakover starts too early, the foot has not imparted all its strength to the racing stride.

We have found that the angle of the outer wall of the toe calk coacts in establishing the breakover point, which may therefore be varied slightly by controlling the angle of the outer wall.

Another factor is involved in the breakover. Ideally, the breakover should be directly forward; but some horses tend to breakover slightly to the side. As long as this tendency is not extreme, we feel that it should be tolerated and the slight lateral-rearward extension of the toe calks prevents side slip at the time of breakover.

Accordingly, the chordal distance 48 of the toe calk is made slightly more than half the width 50 of the horse shoe, this relationship permitting a horse to have a slight sideward breakover, since the toe calk has the same sharp edge and dimension in a slightly sidewise direction. However, should the sidewise breakover tendency be too great, the horse will find it inconvenient, and will be gently educated to have a breakover that is directed more forwardly. In other words our racing plate has a corrective function.

FIGURE 5 also shows how the curvature of the inner wall of the toe calk 24 aids in removing dirt from the bottom of the horseshoe. In the position shown, the downward movement of the horseshoe causes it to sink into the surface of the track, and the relative upward movement of the surface, as shown by the arrow 56, dislodges any accumulated dirt.

Thus, our horseshoe with its smoothly curved undersurface not only minimizes the tendency to collect dirt, but at every stride, the horseshoe is self cleaning.

Under some conditions, some horse trainers believe that the bottom of a horse's hoof should slant slightly upward rather than being parallel to the ground. This result can be achieved by eliminating the heel calks, as shown in the shoe 58 in FIGURE 6, which is otherwise as described above.

The self-cleaning operation of the caulkless horseshoe is substantially the same as that first described above.

Advantages

It will be realized that our horseshoe has innumerable advantages over prior-art racing plates. Firstly, it is of substantially constant weight. Secondly, it is automatically self-cleaning. Thirdly, it helps control the breakover action. Fourthly, it encourages a horse's foot to breakover in a forward direction. And finally, and most importantly, it permits a horse to run a given course in a shorter time than other horseshoes.

It is understood that minor variation from the form of the invention disclosed herein may be made without departure from the spirit and scope of the invention, and that the specification and drawing are to be considered as merely illustrative rather than limiting.

We claim:
1. A self-cleaning racing horseshoe comprising:
an arcuate toe portion, a right-side runner and a left-side runner, the forward end of said runners being continuous with respective ends of said toe portion, said runners having a nailing groove positioned adjacent the outside edge of each said runner, said nailing grooves being adapted to fill with packed dirt during the early stage of use, and to remain packed thereafter, whereby all the four horseshoes tend to have the same additional weight in the form of packed dirt, an arcuate toe calk integral with said toe portion of said horseshoe, said toe calk having a cross section that tapers to a relatively sharp edge to cause said toe calk to penetrate the surface of a race track, the bottoms of said runners and the bottom of said toe portion being continuous, the inner walls of said runners and the inner wall of said toe calk being continuous, said inner walls and said bottoms defining a smooth continuous curved surface in a cross-sectional direction relative to said runners and toe portion and adapted to prevent dirt from adhering thereto, whereby when said toe calk penetrates the surface of said track, the pressure of said surface dislodges any dirt that may be on said smooth continuous surface of said horseshoe, the chordal distance of said toe calk being slightly larger than half the width of said horseshoe.

2. A self-cleaning racing horseshoe comprising:
an arcuate toe portion, a right-side runner and a left-side runner, the forward end of said runners being continuous with respective ends of said toe portion, said runners having a nailing groove positioned adjacent the outside edge of each said runner, the outermost wall of said grooves forming the outermost edge of said runners, said nailing grooves being adapted to fill with packed dirt during the early stage of use, and to remain packed thereafter, whereby all the four horseshoes tend to have the same additional weight in the form of packed dirt, an arcuate toe calk integral with said toe portion of said horseshoe, said toe calk having a cross section that tapers to a relatively sharp edge to cause said toe calk to penetrate the surface of a race track, the bottoms of said runners and the bottom of said toe portion being continuous, the inner walls of said runners and the inner wall of said toe calk being continuous, said inner walls and said bottoms defining a smooth continuous curved surface in a cross-sectional direction relative to said runners and toe portion and adapted to prevent dirt from adhering thereto, whereby when said toe calk penetrates the surface of said track, the pressure of said surface dislodges any dirt that may be on said smooth continuous surface of said horseshoe, the chrodal distance of said toe calk being slightly larger than half the width of said horseshoe.

References Cited by the Examiner
UNITED STATES PATENTS

| | | | |
|---|---|---|---|
| 19,526 | 3/58 | Wheeler | 168—4 |
| 254,534 | 3/82 | Clarke | 168—29 |
| 553,345 | 1/96 | Kent | 168—29 |
| 1,212,592 | 1/17 | Walsh | 168—24 |
| 2,136,215 | 11/38 | Mabius | 168—4 |
| 2,197,166 | 4/40 | Wheeler et al. | 168—29 |

FOREIGN PATENTS 23,990  11/94  Great Britain.

SAMUEL KOREN, *Primary Examiner.*

NEDWIN BERGER, CARL W. ROBINSON, HUGH R. CHAMBLEE, *Examiners.*